United States Patent
Tan et al.

(10) Patent No.: US 10,223,780 B2
(45) Date of Patent: Mar. 5, 2019

(54) IMAGE STEGANALYSIS BASED ON DEEP LEARNING

(71) Applicant: Institute of Automation Chinese Academy of Sciences, Beijing (CN)

(72) Inventors: Tieniu Tan, Beijing (CN); Jing Dong, Beijing (CN); Wei Wang, Beijing (CN); Yinlong Qian, Beijing (CN)

(73) Assignee: Institute of Automation Chinese Academy of Sciences, Beijing (CN)

( * ) Notice: Subject to any disclaimer, the term of this patent is extended or adjusted under 35 U.S.C. 154(b) by 0 days.

(21) Appl. No.: 15/557,080

(22) PCT Filed: Apr. 15, 2015

(86) PCT No.: PCT/CN2015/076600
§ 371 (c)(1),
(2) Date: Sep. 9, 2017

(87) PCT Pub. No.: WO2016/165082
PCT Pub. Date: Oct. 20, 2016

(65) Prior Publication Data
US 2018/0068429 A1     Mar. 8, 2018

(51) Int. Cl.
G06N 3/08     (2006.01)
G06T 1/00     (2006.01)
G06T 7/00     (2017.01)

(52) U.S. Cl.
CPC ........... *G06T 7/0002* (2013.01); *G06N 3/084* (2013.01); *G06T 1/0021* (2013.01);
(Continued)

(58) Field of Classification Search
CPC ................ G06T 2201/0052; G06T 1/005; G06T 1/0064
(Continued)

(56) References Cited

U.S. PATENT DOCUMENTS

| | | | | |
|---|---|---|---|---|
| 7,454,020 B2 * | 11/2008 | Herz | ................ | H04K 1/00 380/255 |
| 7,676,034 B1 * | 3/2010 | Wu | ................ | H04M 3/5233 379/265.01 |

(Continued)

FOREIGN PATENT DOCUMENTS

| CN | 103281473 A | 9/2013 |
|---|---|---|
| CN | 104778702 A | 7/2015 |

OTHER PUBLICATIONS

PCT/CN2015/076600 International Search Report.

*Primary Examiner* — Yosef Kassa
(74) *Attorney, Agent, or Firm* — Howard IP Law, PLLC; Jeremy Howard

(57) ABSTRACT

The present invention provides a method for detecting image steganography based on deep learning, which comprises: filtering images having steganographic class label or true class label in a training set with a high-pass filter to obtain a training set including steganographic class residual images and true class residual images; training a deep network model on said training set to obtain a trained deep model for steganalysis; filtering the image to be detected with said high-pass filter to obtain a residual image to be detected; detecting said residual image to be detected on said deep model so as to determine whether said residual image to be detected is a steganographic image. The method for detecting image steganography in the present invention can create an automatic blind steganalysis model through feature learning and can identify steganographic images accurately.

10 Claims, 3 Drawing Sheets

(52) U.S. Cl.
CPC ............... *G06T 2201/0065* (2013.01); *G06T 2201/0083* (2013.01); *G06T 2207/20024* (2013.01); *G06T 2207/20081* (2013.01); *G06T 2207/20084* (2013.01)

(58) Field of Classification Search
USPC ............... 382/100, 157, 159, 280; 358/3.28, 358/426.02
See application file for complete search history.

(56) References Cited

U.S. PATENT DOCUMENTS

| | | | | |
|---|---|---|---|---|
| 7,885,470 B2 * | 2/2011 | Shi | ................. | G06T 1/005 382/232 |
| 8,391,543 B1 * | 3/2013 | Verma | ................. | G06F 21/556 283/113 |
| 8,542,825 B2 * | 9/2013 | Whillock | ............ | H04L 63/0428 380/200 |
| 8,548,262 B2 * | 10/2013 | Shi | ................. | G06T 1/005 382/232 |
| 8,918,644 B2 * | 12/2014 | Shetty | ................. | H04L 9/3242 713/168 |
| 2003/0012887 A1 | 1/2003 | Orlikowski | | |

\* cited by examiner

IMAGE STEGANALYSIS BASED ON DEEP LEARNING

TECHNICAL FIELD

The present invention relates to the field of image processing, in particular to a method for image steganalysis based on deep learning.

BACKGROUND OF THE INVENTION

With the digitization of media resources and the rapid development and application of the Internet in recent years, acquisition as well as exchange and transmission of digital images over networks become very easy and common, which also facilitated information hiding based on digital images. Steganography is used for embedding secret information into a normal carrier without changing the perceptual characteristics of the carrier, thereby realizing secret transmission of information. With the vigorous development of the information hiding technologies, a lot of steganography methods have emerged. People can conveniently obtain and use various steganography tools to communicate messages over the Internet. However, the misuse of the steganography has caused increasingly prominent information security problems and has brought about potential serious dangers to the country and society. Hence, there is an urgent need for digital image steganalysis technologies. The purpose of digital image steganalysis is to determine whether an image contains extra secret information through analyzing the image data, and it can even estimate the amount of information embedded, estimate the secret key, acquire the secret information, etc. By means of image steganalysis, images containing hidden information can be found, so the use of steganography can be monitored effectively and illegal use of steganography can be prevented, which are significant for network information security.

Currently, there are mainly two types of steganalysis technologies, i.e. a specialized method for some specific steganography tools or a certain type of embedding technology and a universal method that is not exclusive for any specific embedding method. The specialized method usually has a high detection rate, but it is not practicable, because it is impossible to exhaust all hiding algorithms in practical application. Meanwhile, new steganography algorithms continuously emerge. Hence, universal steganalysis becomes more and more important, and study on method of this type has been significantly strengthened in recent years. The universal steganalysis technology, which is also called blind detection technology, is usually viewed as a binary classification problem to distinguish between covers and stegos. Most of existing steganalysis approaches follow a conventional paradigm based on machine learning, which consists of feature extraction and classifier training steps. The detection accuracy of present universal steganalysis methods mainly depends on handcrafted feature design. In the current field of image steganalysis, there are many methods for feature design, typical ones are described, for example, in [J. Fridrich and J. Kodovsky, "Rich Models for Steganalysis of Digital Images," IEEE Trans. on Info. Forensics and Security, vol. 7(3), pp. 868-882, 2012] and [V. Holub and J. Fridrich, "Random projections of residuals for digital image steganalysis," IEEE Transactions on Information Forensics and Security, vol. 8, no. 12, pp. 1996-2006, 2013.] In these methods, the design and selection of features are heavily dependent on specific data sets, and require a lot of time and energy, and they have high requirement on the experiences and knowledge of people. In practical application, the complexity and diversity of real image data have brought more challenges to feature design.

In recent years, with the development of deep learning, automatically learning features from image data using deep learning has gained extensive attention and has been widely applied in areas like recognition and classification. Deep learning is a class of machine learning methods that addresses the problem of what makes better representations and how to learn them. The deep learning models have deep architectures that consist of multiple levels of non-linear processing and can be trained to hierarchically learn complex representations by combining information from lower layers. Moreover, a deep learning model unifies feature extraction and classification modules under a single network architecture, and jointly optimizes all the parameters in both modules. A typical deep learning method is described, for example, in [Hinton G E, Salakhutdinov R R. "Reducing the dimensionality of data with neural networks," Science, 2006, 313(5786): 504-507.] and [Krizhevsky A, Sutskever I, Hinton G E. "Imagenet classification with deep convolutional neural networks," Advances in neural information processing systems. 2012: 1097-1105].

SUMMARY OF THE INVENTION

The present invention provides a method for detecting image steganography based on deep learning so as to create an automatic blind detection model and to more accurately identify stego images.

The present invention provides a method for detecting image steganography based on deep learning, which comprises:

filtering true class images (images without information hiding) and steganographic class images (images with information hiding) in a training set with a high-pass filter to obtain true class residual images and steganographic class residual images respectively;

training a deep network model on said residual images;

filtering the image to be detected with the same high-pass filter in the first step to obtain a residual image;

detecting the obtained residual image to the trained deep learning model so as to determine whether the image to be detected is a steganographic class image.

The present invention has the following advantages:

The present method for detecting image steganography is based on deep learning. In the present invention, the labeled images, including true class images and steganographic class images, in the training set are first filtered with a high-pass filter to obtain residual images, and then these obtained residual images are used to train a deep neural network, and finally a highly universal image steganalysis model is obtained. In this way, it can create a blind detection model through automatic feature learning and can thus identify steganographic class images accurately.

BRIEF DESCRIPTION OF THE DRAWINGS

FIG. 4 shows images involved in respective steps in embodiment 1 of the method for detecting image steganography based on deep learning according to the present invention.

In the figures.

DETAILED DESCRIPTION

Figure 1:
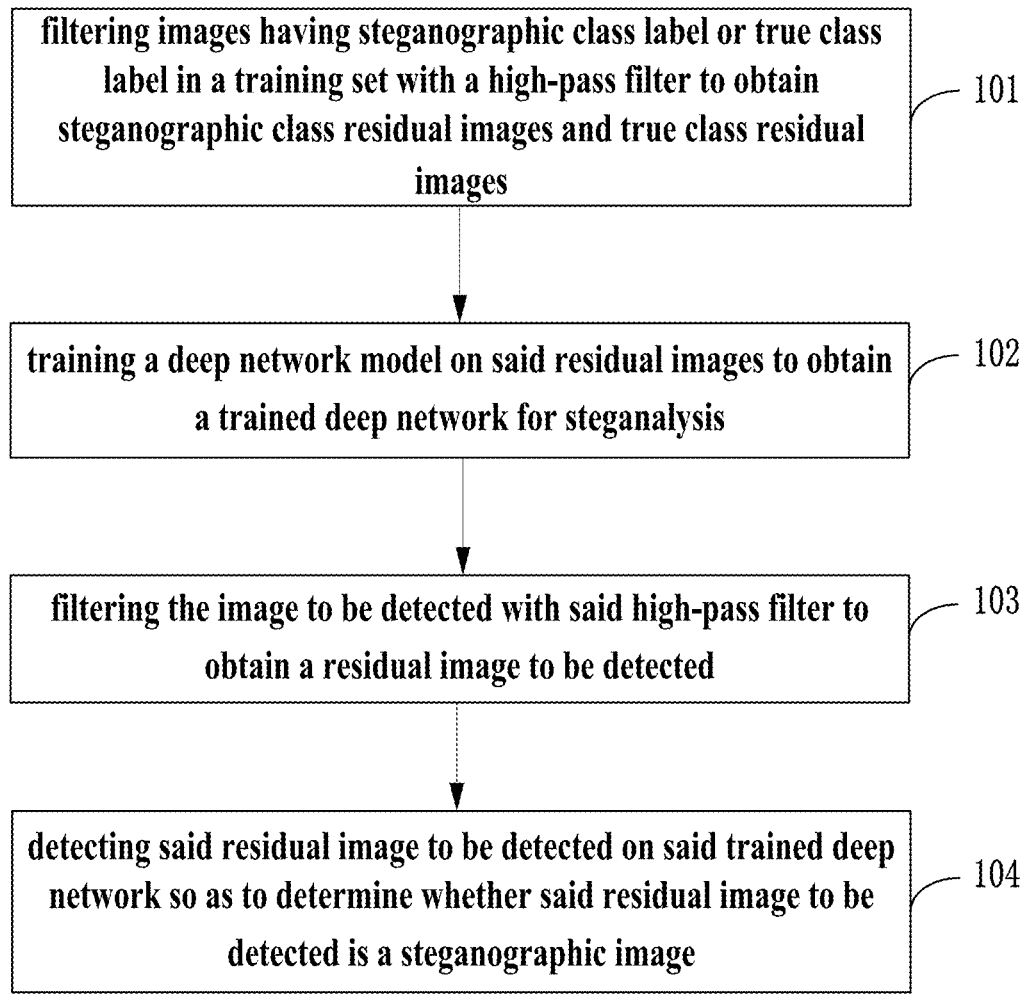
FIG. 1 is a flow chart of embodiment 1 of the method for detecting image steganography based on deep learning according to the present invention.
Figure 2:
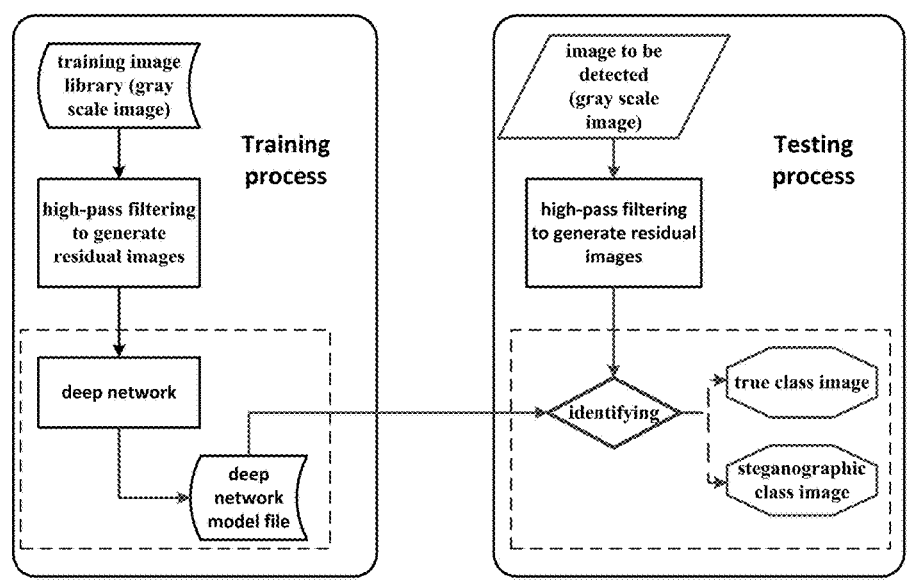
FIG. 2 is a flow block diagram of embodiment 1 of the method for detecting image steganography based on deep learning according to the present invention.
Figure 3:
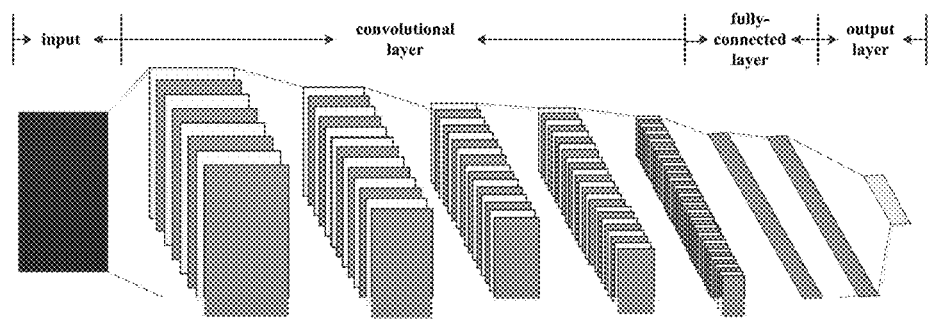
FIG. 3 is a structural diagram of a deep convolutional neural network in embodiment 1 of the method for detecting image steganography based on deep learning according to the present invention.

FIG. 1 is a flow chart of embodiment 1 of the method for detecting image steganography based on deep learning according to the present invention, FIG. 2 is a flow block diagram of embodiment 1 of the method for detecting image steganography based on deep learning according to the present invention, FIG. 3 is a structural diagram of a deep convolutional neural network in embodiment 1 of the method for detecting image steganography based on deep learning according to the present invention. As shown in FIGS. 1, 2 and 3, the method for detecting image steganography based on deep learning according to the present invention comprises:

S101: filtering steganographic class images and true class images in a training set with a high-pass filter to obtain steganographic class residual images and true class residual images. Preferably, said images are gray scale images with a size of 256×256.

Preferably, said filtering with a high-pass filter comprises convolving image I with a filtering kernel template K as shown by equation (1):

$$Z = K \otimes I \qquad (1)$$

wherein, K is a filtering kernel that is included in the commonly used high-pass filters in traditional steganalysis, and said high-pass filters includes linear filtering kernels or non-linear filtering kernels; the present embodiment only provides one of the feasible ways, and K is a matrix with a size of 5×5:

$$K = \frac{1}{12} \begin{bmatrix} -1 & 2 & -2 & 2 & -1 \\ 2 & -6 & 8 & -6 & 2 \\ -2 & 8 & -12 & 8 & -2 \\ 2 & -6 & 8 & -6 & 2 \\ -1 & 2 & -2 & 2 & -1 \end{bmatrix} \qquad (2)$$

S102: training a deep network model using said steganographic class residual images and true class residual images to obtain a deep network based steganalysis model.

Preferably, said deep network is a Convolutional Neural Network (CNN); said CNN comprises at least two convolutional layers, at least one full-connected layer; wherein the CNN, as a representative deep learning method, is a neural network with a special network structure, which incorporates such structure design concepts as local receptive fields, weight sharing, and pooling, and can learn effective feature expressions directly from data.

Preferably, said CNN has altogether 5 convolutional layers, one fully-connected layer, and one output layer; in practical application, the number of convolutional layers and fully-connected layers can be determined according to such specific aspects as the size of the training image, the data scale, etc.; the input and output of each of the convolutional layers are multiple two-dimensional matrixes, which are called feature maps, and the output of each convolutional layer serves as the input of the next layer; wherein the number of feature maps output by each convolutional layer is 16, but other numerical values may also be chosen in practical application.

Preferably, each of the convolutional layers comprises the following three operations:

First, performing a convolution operation according to equation (3):

$$Y_j^l = \Sigma_i X_i^l \otimes K_{ij}^l + b_j^l \qquad (3)$$

wherein, $X_i^l$ represents the $i^{th}$ input matrix of the $l^{th}$ convolutional layer, $K_{ij}^l$ represents a convolutional kernel having a size of m×m for connecting the $i^{th}$ input matrix and the $j^{th}$ convolutional output matrix of the $l^{th}$ convolutional layer, and $b_j^l$ represents the bias of the $j^{th}$ convolutional output matrix of the $l^{th}$ convolutional layer.

Preferably, the convolution kernel of the first and fifth convolutional layers has a size of 5×5, and the convolution kernel of the second to fourth convolutional layers has a size of 3×3; the convolution step size of each layer is 1 and no zero-padding operation is performed; in actual application, a convolution kernel of other sizes may be used.

Second, activating each element in an output matrix $Y_j^{l+1}$ obtained from the convolution operation, here the activation function for elements in the convolutional layers is a Gauss function f(x):

$$f(x) = e^{-x^2} \qquad (4)$$

Finally, performing an average pooling operation for the activated output matrix to obtain a final output of said convolutional layer; wherein an average value pooling function is to calculate a mean value for elements in non-overlapping areas having a size of k×k in the matrix; wherein the size of the pooling windows in each convolutional layer is 3×3 and the step size thereof is 2, but other values may be chosen for the size and step size of the pooling window according to the specific situation.

Each fully-connected layer comprises multiple units; in the present embodiment, each full-connected layer comprises 128 units; in practical application, the number of units in each full-connected layer can be other values according to the specific situation.

Preferably, operation of the full-connected layers comprises connecting two adjacent fully-connected layers according to equation (5):

$$y_i^l = f(\Sigma_i w_{ij}^l x_i^l + b_j^l) \qquad (5)$$

wherein, $x_i^l$ represents an $i^{th}$ input unit of the $l^{th}$ fully-connected layer, $w_{ij}^l$ represents a weight connecting the $i^{th}$ input unit and a $j^{th}$ output unit of the $l^{th}$ fully-connected layer, $b_j^l$ represents the bias of the $j^{th}$ output unit of the $l^{th}$ fully-connected layer; here each unit is connected to all units of the previous layer, wherein the first fully-connected layer is connected to the last convolutional layer, the last fully-connected layer is connected to the output layer, and the output of each layer serves as the input of the next layer; f(x) is an activation function, preferably, an activation function for elements in the full-connected layers is ReLU function (6):

$$f(x) = \max(0, x) \qquad (6)$$

Preferably, the number of the output layer is one, and operation of the output layer comprises:

First, performing a calculation according to equation (7):

$$y_i = \Sigma_i w_{ij} x_i + b_j \qquad (7)$$

wherein, $x_i$ represents an $i^{th}$ input unit of the output layer, $w_{ij}$ represents a weight connecting the $i^{th}$ input unit and a $j^{th}$ output unit of the output layer, $b_j$ represents an offset of the $j^{th}$ output unit of the output layer; wherein the output of the last full-connected layer serves as its input.

Then, activating the output layer, and the activation function for elements in the output layer herein is softmax function (8):

$$Z_i = \frac{e^{y_i}}{\sum_{j=1}^{z} e^{y_j}} \tag{8}$$

wherein $i \in \{1, 2\}$.

Preferably, said training a deep network on the training set on to obtain the trained detection model for steganalysis comprises:
training the CNN using a back propagation algorithm through minimizing the function shown in formula (9) so as to obtain the trained deep network for steganalysis:

$$-\log z_i \tag{9}$$

wherein $i \in \{1, 2\}$.

S103: filtering the image to be detected with the high-pass filter to obtain a residual image.

The process of filtering the image to be detected is the same as in S101, so it will not be elaborated anymore.

Figure 4A:
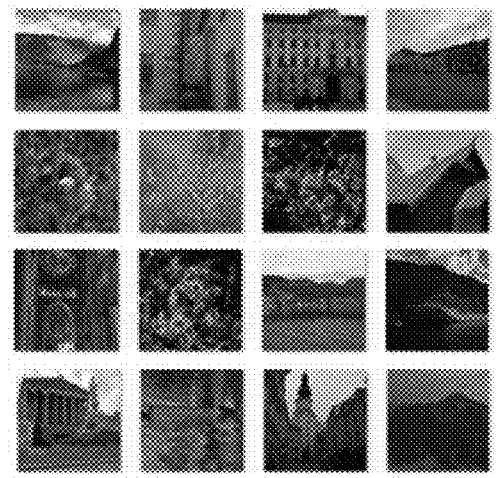
FIG. 4a is an image set corresponding to true class labels in the training set.
Figure 4B:
FIG. 4b is an example of a steganographic class image to be detected.
Figure 4C:
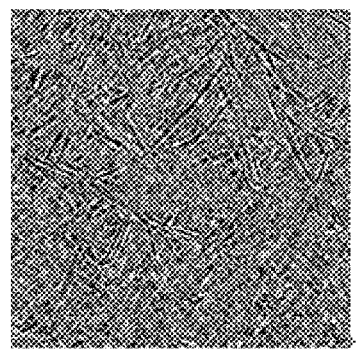
FIG. 4c is an example of a residual image obtained by filtering the image to be detected.

S104: detecting said residual image using said trained deep network based detection model so as to determine whether the corresponding image to be detected to be detected is a steganographic image. FIG. 4 shows images involved in respective steps in embodiment 1 of the method for detecting image steganography based on deep learning according to the present invention; in the figures, FIG. 4a is an image set corresponding to true class labels in the training set, FIG. 4b is an example of a steganographic class image to be detected, FIG. 4c is an example of a residual image obtained by filtering the image to be detected.

Embodiment 1 of the method for detecting image steganography based on deep learning in the present invention filters images that have been labeled in advance and uses said images to form training sets, and then trains a deep neural network on said training sets to obtain a universal image steganalysis model. In this way, it can create an automatic blind detection model through deep learning and can identify steganography images accurately.

FIG. 1 is a flow chart of embodiment 1 of a method for detecting image steganography based on deep learning according to the present invention. In embodiment 2, the steps are the same as those in embodiment 1 embodiment 1, and the differences lies in:

S102: training a deep network model using said steganographic class residual images and true class residual images to obtain a deep network based steganalysis model.

Preferably, said deep network model is a deep convolutional neural network CNN; said deep convolutional neural network CNN comprises at least two convolutional layers that are cascaded at the inputs and outputs thereof in turn, at least one fully-connected layer and an output layer.

Preferably, said CNN has altogether 5 convolutional layers and 1 fully-connected layers; in practical application, the number of convolutional layers and fully-connected layers can be determined according to such specific aspects as the size of the training image, the data scale, etc.; the input and output of each of the convolutional layers are multiple two-dimensional matrixes, which are called feature graphs, and the output of each convolutional layer serves as the input of the next layer; wherein the number of feature graphs output by each convolutional layer is 16.

Preferably, each of the convolutional layers comprises the following three operations:

First, performing a convolution operation according to equation (3):

$$Y_j^l = \Sigma_i x_i^l \otimes K_{ij}^l + b_j^l \tag{3}$$

wherein, $X_i^l$ represents the $i^{th}$ input matrix of the $l^{th}$ convolutional layer, $K_{ij}^l$: represents a convolutional kernel having a size of m×m for connecting the $i^{th}$ input matrix and the $j^{th}$ convolutional output matrix of the $l^{th}$ convolutional layer, and $b_j^l$: represents an offset of the $j^{th}$ convolutional output matrix of the $l^{th}$ convolutional layer.

Preferably, the convolution kernel of the first and fifth convolutional layers has a size of 5×5, and the convolution kernel of the second to fourth convolutional layers has a size of 3×3; the convolution step size of each layer is 1 and zero-padding operation is performed.

Second, activating each element in an output matrix $Y_j^{l+1}$ obtained from the convolution operation, here an activation function for elements in the convolutional layers is a Gauss function f(x):

$$f(x) = e^{-x^2} \tag{4}$$

Finally, in the operations included in the convolutional layer, performing a average pooling operation to the activated output matrix to obtain a final output of said convolutional layer; wherein the size of the pooling windows in each convolutional layer is 5×5 and the step size thereof is 2, but other values may be chosen for the size and step size of the pooling window according to the specific situation.

Each fully-connected layer comprises multiple units; in the present embodiment, each full-connected layer comprises 256 units; in practical application, the number of units in each fully-connected layer can be other values according to the specific situation.

Preferably, operation of the fully-connected layers comprises connecting two adjacent fully-connected layers according to equation (5):

$$y_i^l = f(\Sigma_i w_{ij}^l x_i^l + b_j^l) \tag{5}$$

wherein, $x_i^l$ represents an $i^{th}$ input unit of the $l^{th}$ fully-connected layer, $w_{ij}^l$ represents a weight connecting the $i^{th}$ input unit and a $j^{th}$ output unit of the $l^{th}$ fully-connected layer, $b_j^l$ represents the bias of the $j^{th}$ output unit of the $l^{th}$ fully-connected layer; here each unit is connected to all units of the previous layer, wherein the first fully-connected layer is connected to the last convolutional layer, the last fully-connected layer is connected to the output layer, and the output of each layer serves as the input of the next layer; f(x) is an activation function, preferably, an activation function for elements in the full-connected layers is ReLU function (6):

$$f(x) = \max(0, x) \tag{6}$$

Preferably, the number of the output layer is one, and operation of the output layer comprises:

First, performing a calculation according to equation (7):

$$y_i = \Sigma_i w_{ij} x_i + b_j \tag{7}$$

wherein, $x_i$ represents an $i^{th}$ input unit of the output layer, $w_{ij}$ represents a weight connecting the $i^{th}$ input unit and a $j^{th}$ output unit of the output layer, $b_j$ represents the bias of the $j^{th}$ output unit of the output layer; wherein the output of the last full-connected layer serves as its input.

Then, activating the output layer, and an activation function for elements in the output layer herein is softmax function (8):

$$Z_i = \frac{e^{y_i}}{\sum_{j=1}^{z} e^{y_j}} \qquad (8)$$

wherein $i \in \{1, 2\}$.

Preferably, said training a deep network on the training set on to obtain the trained detection model for steganalysis comprises:

training the CNN using a back propagation algorithm through minimizing the function shown in formula (9) so as to obtain the trained deep network for steganalysis:

$$-\log z_i \qquad (9)$$

wherein $i \in \{1, 2\}$.

Finally it shall be noted that the above embodiments are merely for illustrating instead of limiting the technical solutions of the present invention; while the present invention has been described in detail with reference to the above embodiments, those skilled in the art shall understand that modifications can be made to the technical solutions recited in the above embodiments, or equivalent substitutions can be made to some or all of the technical features thereof; such modifications or substitutions will not make the corresponding technical solutions to substantively depart from the scope of the technical solutions described in the embodiments of the present invention.

What is claimed is:

1. A method for detecting image steganography based on deep learning, characterized by comprising:
    filtering images having steganographic class label or true class label in a training set with a high-pass filter to obtain a training set including steganographic class residual images and true class residual images;
    training a deep network model on said training set to obtain a trained deep network for steganalysis;
    filtering the image to be detected with said high-pass filter to obtain a residual image to be detected;
    detecting said residual image to be detected on said trained deep network so as to determine whether said residual image to be detected is a steganographic image.

2. The method for detecting image steganography based on deep learning according to claim 1, characterized in that said deep network model is a Convolutional Neural Network (CNN).

3. The method for detecting image steganography based on deep learning according to claim 2, characterized in that said CNN comprises at least two convolutional layers, at least one fully-connected layer and an output layer.

4. The method for detecting image steganography based on deep learning according to claim 3, characterized in that an activation function for elements in the convolutional layers is a Gauss function.

5. The method for detecting image steganography based on deep learning according to claim 3, characterized in that an activation function for elements in the fully-connected layer is a ReLU function (6):

$$f(x) = \max(0, x) \qquad (6).$$

6. The method for detecting image steganography based on deep learning according to claim 3, characterized in that an activation function for elements in the output layer is a softmax function (8):

$$Z_i = \frac{e^{y_i}}{\sum_{j=1}^{z} e^{y_j}}. \qquad (8)$$

7. The method for detecting image steganography based on deep learning according to claim 2, characterized in that said training the deep network model comprises performing an average pooling operation to pooling windows corresponding to the convolutional layer.

8. The method for detecting image steganography based on deep learning according to claim 2, characterized in that said training a deep network model to obtain the trained deep network for steganalysis comprises:
    training the deep convolutional neural network CNN using a back propagation algorithm through minimizing the function shown in formula (9) so as to obtain the trained deep network for steganalysis:

$$-\log z_i \qquad (9)$$

wherein $i \in \{1, 2\}$.

9. The method for detecting image steganography based on deep learning according to claim 1, characterized in that said high-pass filter can be either linear or non-linear.

10. The method for detecting image steganography based on deep learning according to claim 1, characterized in that said image is a gray scale image.

* * * * *